United States Patent
Krick et al.

(10) Patent No.: US 6,950,906 B2
(45) Date of Patent: Sep. 27, 2005

(54) SYSTEM FOR AND METHOD OF OPERATING A CACHE

(75) Inventors: Robert F. Krick, Fort Collins, CO (US); Duane A. Wiens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 10/319,205

(22) Filed: Dec. 13, 2002

(65) Prior Publication Data

US 2004/0117558 A1 Jun. 17, 2004

(51) Int. Cl.[7] .............................................. G06F 12/00
(52) U.S. Cl. ....................... 711/141; 711/128; 711/147; 711/140
(58) Field of Search ........................ 365/189.02, 230.02; 711/118, 141, 220, 133, 154, 128

(56) References Cited

U.S. PATENT DOCUMENTS

| | | | | |
|---|---|---|---|---|
| 5,564,034 A | * | 10/1996 | Miyake ...................... | 711/128 |
| 5,675,765 A | * | 10/1997 | Malamy et al. ............. | 711/146 |
| 5,835,929 A | * | 11/1998 | Gaskins et al. ................ | 711/3 |
| 6,385,696 B1 | * | 5/2002 | Doweck ..................... | 711/128 |
| 6,629,205 B2 | * | 9/2003 | Cypher ....................... | 711/118 |

OTHER PUBLICATIONS

Sawada et al., "A 32–kbyte Integrated Cache Memory", © 1989 IEEE, p. 881–887.*
Arimoto et al., "A Circuit Design of Intelligent Cache DRAM with Automatic Write–Back Capability", © 1991 IEEE, p. 560–565.*
Chuang et al., "Architecture and Design of a Pseudo Two–Port VLSI Snoopy Cache Memory", © 1990 IEEE, p. 400–407.*
M. Papamarcos and J. Patel, "A Low Overhead Coherence Solution for Multiprocessors with Private Cache Memories" (Proceedings of the 11th International Symposium on Computer Architecture, IEEE, New York (1984), pp. 348–354.
DeBlaisl; "Computer Architecture" ISBN 0–201–41603–4 (Addison–Wesley, 1990), pp 273–291.
Stone, "High Performance Computer Architecture" ISBN 0–201–51377–3 (Addison–Wesley, 2d Ed. 1990), pp. 29–39.
D. Patterson and J. Hennessy, "Computer Architecture: A Quantitative Approach" (Morgan Kaufmann Publishers, Inc., 1990) pp 467–471.
D. Tabak, "Advanced Microprocessors" (ISBN 0–07–062807–5 (McGraw–Hill, 1991), pp. 244–248.
U.S. Appl. No. 09/853,738, Wiens et al.
U.S. Appl. No. 09/853,951, Krick et al.
U.S. Appl. No. 10/118,801, Krick et al.

* cited by examiner

Primary Examiner—Brian R. Peugh (57) ABSTRACT

A method of operating a cache comprises the steps of reading first information from a tag memory for at least two cache lines; reading second information from the tag memory for at least two cache lines; writing third information to the tag memory updating the first information; comparing (i) an address of the tag memory associated with the step of reading the second information with (ii) an address of the tag memory associated with the step of writing the third information and, in response, selectively replacing the second information with the third information; and writing, after the step of comparing, fourth information to the tag memory updating the second information.

25 Claims, 7 Drawing Sheets

SYSTEM FOR AND METHOD OF OPERATING A CACHE

CROSS-REFERENCE TO RELATED APPLICATIONS

The present application is related to previously filed, commonly assigned U.S. patent application Ser. No. 09/853,738, entitled "FAST PRIORITY DETERMINATION CIRCUIT WITH ROTATING PRIORITY," filed May 10, 2001, now abandoned commonly assigned U.S. patent application Ser. No. 09/853,951, entitled "SYSTEM OF AND METHOD FOR MEMORY ARBITRATION USING MULTIPLE QUEUES," filed May 10, 2001, and commonly assigned U.S. patent application Ser. No. 10/118,801, entitled "SYSTEM OF AND METHOD FOR FLOW CONTROL WITHIN A TAG PIPELINE," filed Apr. 9, 2002, the disclosures of which are hereby incorporated herein by reference.

FIELD OF THE INVENTION

This invention relates generally to computer memory systems and more specifically to memory control within a system to improve access time to data using memory.

DESCRIPTION OF RELATED ART

There is an ever growing need to increase the speed with which computers process information. One element for increasing overall processing speed includes improving memory access time. As one skilled in the art recognizes, memory latency is a major limitation on processing speed, an issue that has been addressed using a multitude of techniques and approaches.

A common manner by which to improve memory access time is to provide a cache memory along with a main memory. A cache memory is typically associated with a processor and requires less access time than the main memory. Copies of data from processor reads and writes are retained in the cache. Some cache systems retain recent reads and writes, while others may have more complex algorithms to determine which data is retained in the cache memory. When a processor requests data that is currently resident in the cache, only the cache memory is accessed. Since the cache memory requires less access time than the main memory, processing speed is improved. Today, memory accesses from the main memory may take 250 nanoseconds or longer, while cache access may take as little as two or three nanoseconds.

A cache system may also be used to increase the effective speed of a data write. For example, if a processor is to write to a storage location, the processor may perform a data write to the cache memory. The cache memory and associated control logic may then write the data to the main memory while the processor proceeds with other tasks.

Computer systems may also extend the use of cache and may employ a multilevel hierarchy of cache memory, with a small amount of relatively fast primary or first level cache memory at the highest level of the hierarchy and proceeding to relatively slower, lower cost, higher-capacity memory at the lowest level of the hierarchy. The primary cache may be physically integrated within a processor integrated circuit or mounted physically near the processor. Primary cache incorporated on the same chip as the Central Processing Unit (CPU) may have a clock frequency (and therefore an access time) equal to the cycle frequency of the CPU. There may be separate instruction primary cache and data primary cache. Primary caches typically maximize performance over a relatively small amount of memory so as to minimize data and/or instruction latency. In addition, primary cache typically supports high bandwidth transfers. Secondary cache or tertiary cache may also be used and is typically located further from the processor. These secondary and tertiary caches provide a "backstop" to the primary cache and generally have larger capacity, higher latency, and lower bandwidth than primary cache.

If a processor requests data or instruction from a primary cache and the item is present in the primary cache, a cache "hit" results. Conversely, if an item is not present, there is a primary cache "miss." In the event of a primary cache miss, the requested item is retrieved from the next level of the cache memory or, if the requested item is not contained in cache memory, from the main memory.

Typically, memories are organized into groupings of bits called words (for example, 32 bits or 64 bits per word). The minimum amount of memory that can be transferred between a cache and a next lower level of the memory hierarchy is called a cache line, or sometimes a block. A cache line is typically multiple words (for example, 16 words per cache line or block).

Caches have been constructed using three principal architectures: direct-mapped, set-associative, and fully-associative. Details of the three cache types are described in the following three prior art references, the contents of which are hereby incorporated by reference in their entirety: De Blasi, "Computer Architecture," ISBN 0-201-41603-4 (Addison-Wesley, 1990), pp. 273–291; Stone, "High Performance Computer Architecture," ISBN 0-201-51377-3 (Addison-Wesley, 2d Ed. 1990), pp. 29–39; Tabak, "Advanced Microprocessors," ISBN 0-07-062807-6 (McGraw-Hill, 1991) pp. 244–248.

With direct mapping, when a line of memory is requested, only one line in the cache has matching index bits. Therefore, the data can be retrieved immediately and driven onto a data bus before the system determines whether the rest of the address matches. The data may or may not be valid, but in the usual case where it is valid, the data bits are available on a data bus before the system confirms validity of the data.

With set-associative caches, it is not known which line corresponds to an address until the index address is computed and the tag address is read and compared. That is, in set-associative caches, the result of a tag comparison is used to select which line of data bits within a set of lines is presented to the processor.

A cache is said to be fully associative when a cache stores an entire line address along with the data and any line can be placed anywhere in the cache. However, for a large cache in which any line can be placed anywhere, substantial hardware is required to rapidly determine if and where an entry is stored in the cache. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only within a set of cache lines designated by the index. If the cache is arranged so that the index for a given address maps to exactly one line in the subset, the cache is said to be direct mapped. If the index maps to more than one line in the subset, the cache is said to be set-associative. All or part of an address is hashed to provide a set index which partitions the address space into sets.

In all three types of caches, an input address is applied to comparison logic to determine if the desired memory location resides in the cache. Typically, a subset of the address, called tag bits, is extracted from the input address and compared to tag bits of each cache entry. If the tag bits match, then corresponding data is extracted from the cache.

In general, direct-mapped caches provide fastest access but require the most time for comparing tag bits. Fully-associative caches have greater access time, consume higher power and require more complex circuitry.

When multiple processors with their own respective caches are included in a system, cache coherency protocols are used to maintain coherency between and among the caches. This is because the same data may be stored in or requested by more than one cache. There are two classes of cache coherency protocols:

1. Directory based: The information about one block of physical memory is maintained in a single, common location. This information usually includes which cache(s) has a copy of the block and whether that copy is marked exclusive for future modification. An access to a particular block first queries the directory to see if the memory data is stale and the current data resides in some other cache (if at all). If it is, then the cache containing the modified block is forced to return its data to memory. Then the memory forwards the data to the new requester, updating the directory with the new location of that block. This protocol minimizes interbus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or "snoop" on the bus to determine whether or not they have a copy of the shared block.

Snooping protocols are well suited for multiprocessor system architecture that use caches and shared memory because they operate in the context of the preexisting physical connection usually provided between the bus and the memory. Snooping is often preferred over directory protocols because the amount of coherency information is proportional to the number of blocks in a cache, rather than the number of blocks in main memory.

The coherency problem arises in a multiprocessor architecture when a processor must have exclusive access to write a block of memory or an object into memory, and/or must have the most recent copy when reading an object. A snooping protocol must locate all caches that share the object to be written. The consequences of a write to shared data are either to invalidate all other copies of the data, or to broadcast the write to all of the shared copies. Coherency protocols must also cause checks on all caches during memory reads to determine which processor has the most up-to-date copy of the information.

Data concerning information that is shared among the processors is added to status bits that are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to reflect the most recent value.

Snooping protocols are of two types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J. Hennessy, D. Patterson, Computer Architecture: A Quantitative Approach, Morgan Kaufmann Publishers, Inc. (1990), the disclosure of which is incorporated herein by reference in its entirety.

In a snooping coherence multiprocessor system architecture, each coherent transaction on the system bus is forwarded to each processor's cache subsystem to perform a coherency check. This check usually disturbs and/or disrupts the processor's pipeline because the cache cannot be accessed by the processor while the coherency check is taking place.

In a traditional, single-ported cache without duplicate cache tags, the processor pipeline is stalled on cache access instructions when the cache controller is busy processing cache coherency checks for other processors. For each snoop, the cache controller must first check the cache tags for the snoop address, and then modify the cache state if there is a hit. Allocating cache bandwidth for an atomic (unseparable) tag read and write (for possible modification) locks the cache from the processor longer than needed if the snoop does not require a tag write. Atomic means that the read and write are bound tightly together and they are coupled such that there is nothing that can occur between the read and the write. For example, 80% to 90% of the cache queries are misses, i.e., a tag write is not required. In a multi-level cache hierarchy, many of these misses may be filtered if the inclusion property is obeyed. An inclusion property allows information to be stored in the highest level of cache concerning the contents of the lower cache levels.

The speed at which computers transact information for many applications, can also be increased by increasing the size of the caches, especially the primary cache. As the size of the primary cache increases, main memory accesses are reduced and the overall processing speed increases. Similarly, as the size of the secondary cache increases, the main memory accesses are reduced and the overall processing speed is increased, though not as effectively as increasing the size of the primary cache.

Typically, in computer systems, primary caches, secondary caches and tertiary caches are implemented using Static Random Access Memory (SRAM). The use of SRAM allows reduced access time which increases the speed at which information can be transacted. Dynamic Random Access Memory (DRAM) is typically used for the main memory as it is less expensive, requires less power, and provides greater storage densities.

Typically, prior art computer systems limited the number of outstanding transactions to the cache at a given time. If more than one transaction were received by a cache, the cache would transact the requests serially. For instance, if two transactions were received by a cache, the first transaction request received would be transacted first with the second transaction held until the first transaction was completed. Once the first transaction was completed the cache would transact the second transaction request.

Numerous protocols exist that maintain cache coherency across multiple caches and main memory. One such protocol is called MESI which is described in detail in M. Papamarcos and J. Patel, "A Low Overhead Coherent Solution for Multiprocessors with Private Cache Memories," in Proceedings of the 11$^{th}$ International Symposium on Computer Architecture, IEEE, New York (1984), pp. 348–354, incorporated herein by reference in its entirety. MESI stands for Modified, Exclusive, Shared, Invalid, the four status conditions for data. Under the MESI protocol, a cache line is categorized according to its use. A modified cache line indicates that the particular line has been written to by the cache that is the current "owner" of the line. (As used herein, the term "owner" refers to a designation representing authority to exercise control over the data). An exclusive cache line indicates that a cache has exclusive ownership of the cache line, which will allow the cache controller to modify the cache line. A shared cache line indicates that one or more caches have ownership of the line. A shared cache line is considered to be read-only and any device under the cache may read the line but is not permitted to write to the cache. An invalid cache line identifies a cache line whose data may not be valid since the cache no longer owns the cache line.

BRIEF SUMMARY OF THE INVENTION

A method of operating a cache according to one aspect of the invention comprises the steps of reading first information from a tag memory for at least two cache lines; reading second information from the tag memory for at least two cache lines; writing third information to the tag memory updating the first information; comparing (i) an address of the tag memory associated with the step of reading the second information with (ii) an address of the tag memory associated with the step of writing the third information and, in response, selectively replacing the second information with the third information; ; and writing, after the step of comparing, fourth information to the tag memory updating the second information.

A circuit for operating a cache according to another aspect of the invention comprises a tag memory storing first and second information each for at least two cache lines; a tag pipeline connected to the tag memory to supply addressing information to the tag memory to read the first and second information; a data bus connecting the tag memory to the tag pipeline for transmitting the first and second information to the tag pipeline, the tag pipeline further configured to cause the tag memory to write third information to the tag memory; updating the first information; a comparator configured to compare (i) an address of the tag memory associated with the second information with (ii) an address of the tag memory associated with the third information; a first multiplexer responsive to a compare a signal output by the comparator for causing the second information to be selectively updated by the third information to form updated second information; ; and a second multiplexer operational to cause the tag pipeline to selectively modify the updated second information with the fourth information.

A circuit for operating a cache according to another aspect of the invention comprises means for reading first information from a tag memory for at least two cache lines; means for reading second information from the tag memory for at least two cache lines; means for writing third information to the tag memory; updating the first information; means for comparing (i) an address of the tag memory associated with the reading of the second information with (ii) an address of the tag memory associated with the writing of the third information and, in response, selectively replacing the second information with the third information; and means for writing, after the selective replacement, fourth information to the tag memory updating the second information.

DETAILED DESCRIPTION

Generally, a memory hierarchy includes numerous components and subsystems that operate at various speeds. These speeds may differ from the speed of the associated Central Processing Unit (CPU). Typically, as the "distance" from the CPU increases, the speed of the component decreases. These speed mismatches may be addressed by queuing or storing the delayed operations. For example, Static Random Access Memory (SRAM) is used in cache operations due to its inherent operating speed. In contrast, Dynamic Random Access Memory (DRAM) technology has generally not been used for caches because it offers little benefit, in terms of access time, relative to the main memory. However, DRAM technology is approximately four times less expensive per bit of storage than SRAM and, because of its higher density, allows a much larger cache to be implemented for a given area. When "on package" real estate is critical, the density advantage of DRAM verses SRAM also becomes critical.

As the size of the SRAM implemented primary cache increases, the size of the memory required for the secondary or tertiary cache also increases. Typically when a multi-tiered cache hierarchy is implemented, the size of the memory at each succeeding level is increased by a factor of four or eight. Therefore, for a primary cache of one megabyte, a secondary cache of four to eight megabytes is desirable. As the size of the secondary cache increases, the use of SRAM becomes prohibitive because of its limited density. By using DRAM technology secondary caches of thirty two megabytes, or more, are practical. While time to access information stored in DRAM secondary cache increases, the overall affect is offset by the low primary cache miss rate associated with the larger primary cache. In other words, as the size of the primary cache increases, the secondary cache can exhibit a longer latency without degrading system performance.

To further reduce the latency associated with the secondary cache, DRAM memory can be designed to include a faster access time. This faster access time is accomplished by using smaller DRAM chips than in main memory, increasing the number of pins used to transfer data to and from the DRAM, and increasing the frequency with which the DRAM chip operates. Using these techniques (i.e., increase transfer bandwidth) DRAM chips can be designed to access a cache line in the order of 15 nanoseconds and complete the transfer within a second 15 nanoseconds.

Both the increased size of the secondary cache and its longer latency period (as compared to the primary cache) require a methodology to deal with multiple unfulfilled requests for data from the secondary cache. For example, assuming that requests may be received as fast as every two nanoseconds, and if it takes an average of 15 nanoseconds for a request to be serviced, multiple additional requests may be received while the previous request is being serviced. While prior art systems have handled numerous requests to SRAM secondary cache sequentially, the use of larger DRAM secondary cache structures requires a more robust approach. Note that while the present description discusses a single processor requesting a cache line, the structure would be equally applicable to a number of processors which share the secondary cache.

Figure 1:
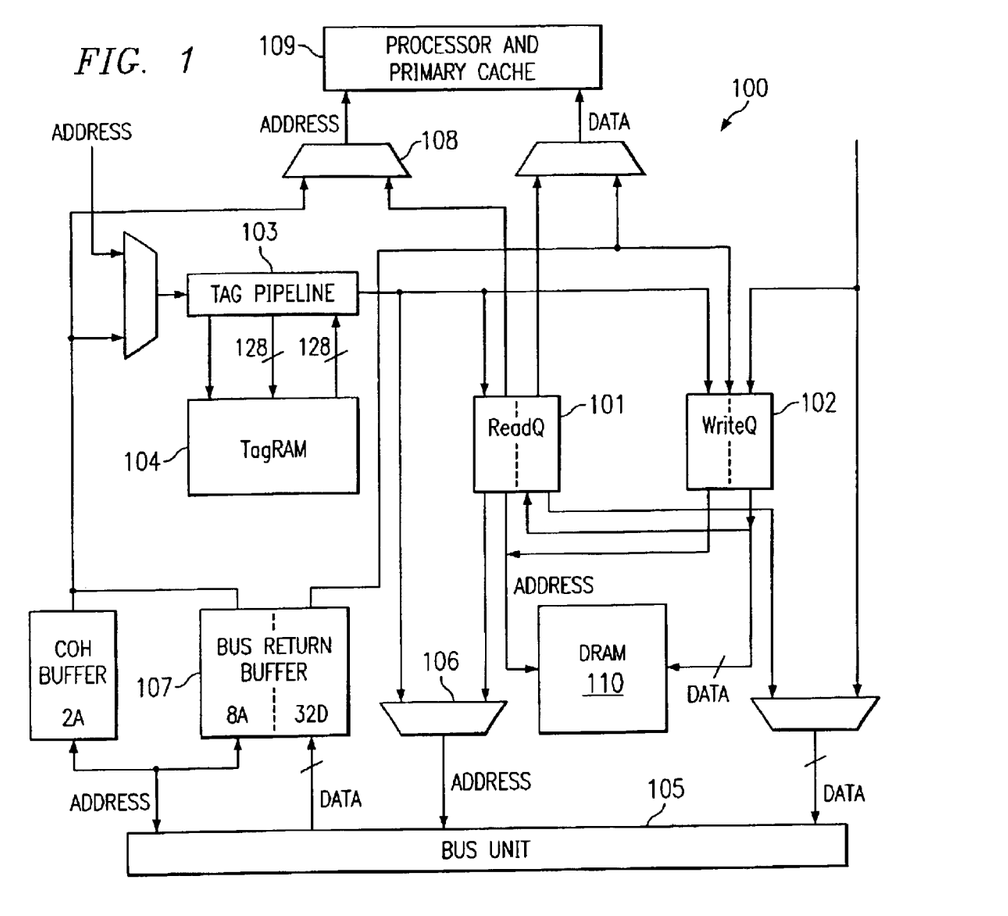
FIG. 1 is a block diagram depicting a secondary cache structure which includes a tag pipeline and a TagRAM.

FIG. 1 shows secondary cache structure 100 that includes two queues, Read queue (readQ) 101 and write queue (writeQ) 102. Tag pipeline 103 and tagRAM 104 are used to determine whether the requested cache line is resident in the secondary cache. Tag pipeline 103 is also operative to make room for a new cache line to be written into the secondary cache. If the cache line is resident in the secondary cache, the request is sent by tag pipeline 103 to readQ 101 which then acts on the request. ReadQ 101 then supplies the cache line to the CPU. If the cache line is not resident, the request is sent by tag pipeline 103 to bus unit 105 via multiplexer 106. Cache lines returning from bus unit 105 pass through bus return buffer 107 and are sent via multiplexer 108 to processor and/or primary cache 109. Cache lines returning from bus unit 105 can also be stored in the secondary cache to reduce access time for subsequent retrievals of the same cache line. In some cache architectures tag pipeline 103 and tagRAM 104 treat operations from the CPU atomically and sequentially. This hides the queuing behavior that is necessary to provide the data. Note that the use of ReadQ 101 and WriteQ 102 is for illustrative purposes only and do not limit the present invention.

In a preferred embodiment tagRAM 104 contains 65,536 rows (indices) and 4 columns (ways) and is used to determine the location of a cache line in DRAM 110. When a request is received from the primary cache, tag pipeline 103 calculates an index that is used to access tagRAM 104. In a preferred embodiment, forty-four bits (0 through 43) are used to address main memory, with 0 being the most significant bit and 43 being the least significant bit. Since each cache line contains 128 bytes, the lower seven bits (37 through 43) are not used and can be dropped. Sixteen of the remaining bits (21 through 36) are used by tag pipeline 103 to calculate the index (205 of FIG. 2) for both tagRAM 104 as well as DRAM 110. The remaining bits, bits 0 through 20, are referred to as the "tag," and are stored in the appropriate portion of tagRAM 104. The bits stored in tagRAM 104, as well as the location as to where the bits are stored, are used by tag pipeline 103 to determine if the desired cache line is present in the secondary cache. Note that while FIG. 1 uses DRAM any other type of memory including SRAM may be used to implement the present invention.

The steps or stages required for a cache system to process a request usually consist of a read stage used to determine the contents of a cache, an operation stage or stages, and a write stage which is used to update the state of a cache. The operation stage(s) may be used for a variety of reasons such as identifying cache hit status, generating data to write back to the tag rams, Error Correction logic, covering physical distances between tagRAM 104 and the control logic, or similar considerations. Some cache architectures process requests atomically and sequentially, in which case all stages of a cache request are completed before any part of a subsequent request is started. Treating operations atomically is less efficient than pipelining the stages. However with a pipeline, when a transaction has not completed the corresponding write stage to tagRAM 104, "stale" data may be read during the read stage for a subsequent transaction.

Figure 2:
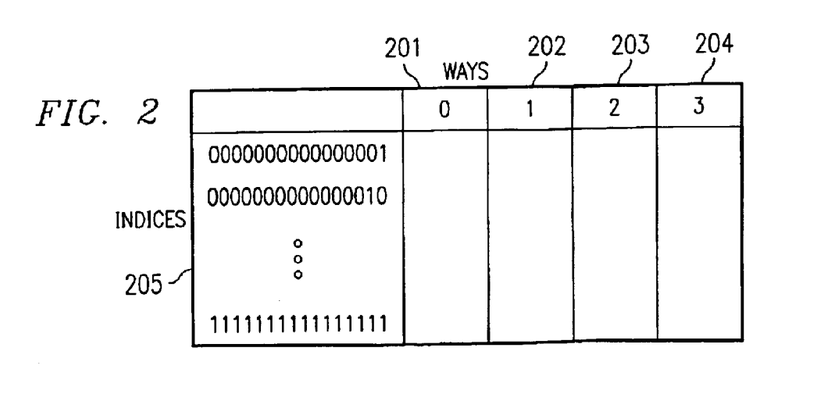
FIG. 2 is a diagram showing a two dimensional tagRAM of FIG. 1.

FIG. 2 illustrates a preferred embodiment of tagRAM 104 which includes four ways 201–204 that are checked to determine if the cache line is present in the secondary cache.

Note that a pipeline may be composed of a series of latches that are used to distribute a process or work over a number of clock cycles. Tag pipeline 103 and tagRAM 104 of FIG. 1 display the characteristics of a fast cache to the rest of the system in FIG. 1. Transactions received by tag pipeline 103 are processed in the order in which they are received from the CPU.

In configurations in which the read and associated write operations for the tagRAM are separated by several stages (and corresponding cycles), binding these reads and writes together as atomic operations results in wasted cycles. Read and write operations may be separated by stages because tagRAM 104 (FIG. 1) and cache logic are physically separated resulting in relatively long access times or in configurations which include Error Checking and Correction (ECC) to ensure data accuracy. In a preferred embodiment the read and write of tagRAM 104 is separated by four interim cycles. In this configuration, requiring the read and write transactions to be atomic would require subsequent operations to be placed on hold, or in a wait state, for the intermediate four cycles. By allowing operations to occur during these four cycles two potential problems occur. First, a processor or memory location may read stale data by performing a second read between the read stage but before the subsequent write stage for the first transaction. Second, a previous unrelated write may occur after the read has occurred but before the corresponding write has occurred. Each of these two cases results in stale data being read from tagRAM 104. The present invention eliminates the use of stale data through the use of bypass logic. The bypass logic supplies the updated information to the transaction that read the stale data.

Figure 3:
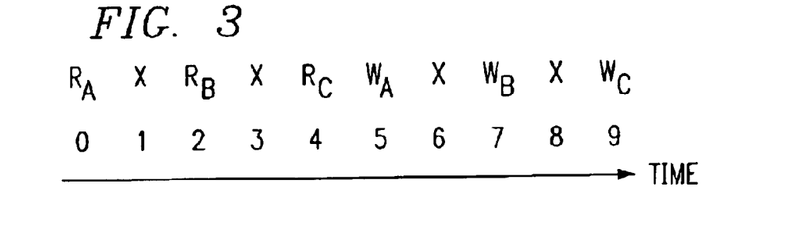
FIG. 3 depicts a time line including three reads and three associated writes.

FIG. 3 depicts a time line including three reads and three associated writes. For every access of the cache tag a read and a corresponding write are present. At time 0, a read of index "A" ($R_A$, the cache array), or tagRAM 104, occurs and at time 5, the write of index A ($W_A$) occurs. The four intermediate cycles, corresponding to times 1, 2, 3 and 4, are included to allow for long access times or ECC. Note that during this process a determination as to whether the information is included in the cache is made. This step may include a comparison between the tag read at time 0 with the request for the cache line of interest. If a determination is made that the cache line is present, and if the tags match our request, then the cache line is present and will be retrieved from the cache. The cycle associated with time 5 corresponds to when the tagRAM write occurs, and is when the array is actually updated to reflect any change of the cache line in tagRAM 104. Similarly, $R_B$ occurs at time 2 and five cycles later (allowing four cycles between the read and the write) at time 7 the corresponding $W_B$ occurs. At time 4 $R_C$ occurs and at time 9 $W_C$ occurs. In this sequence, the cycles corresponding to time 1, 3, 6 and 8 are dead cycles. Note that stale data will not be used in FIG. 3 as long as A, B and C do not correspond to the same index. Also note that if A, B and C correspond to the same index, stale date will be read during readB and readC because both reads occur after the $R_A$ at time 0 but prior to the $W_A$ at time 5.

Figure 4:
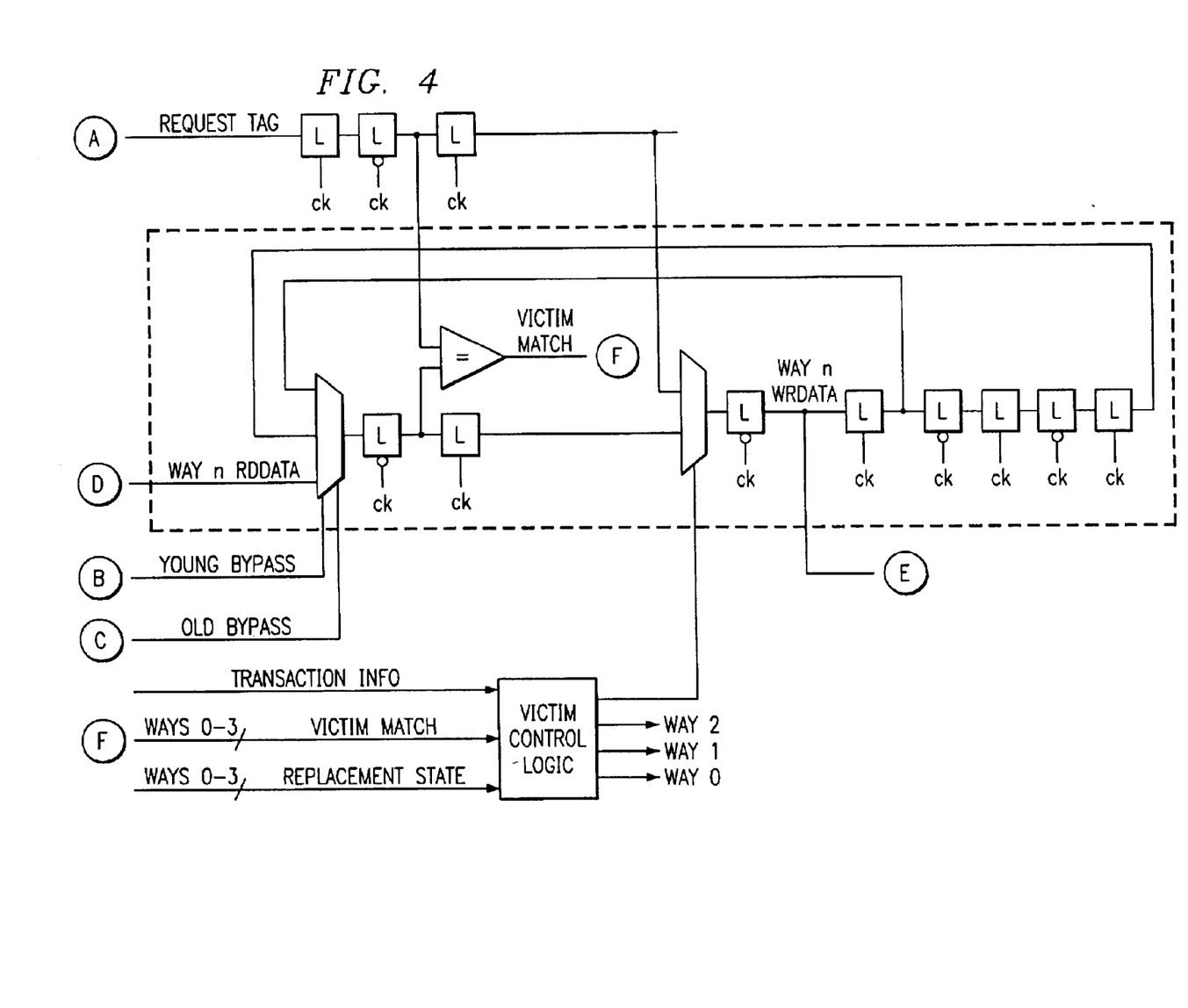
FIG. 4 illustrates a conventional or "brute force" approach to ensuring stale data is not used.

FIG. 4 illustrates a conventional or "brute force" approach for ensuring stale data is not used by a processor. The brute force approach in an N-way associative cache would be to bypass the information from, referring to FIG. 3, $W_A$ to both $R_B$ and $R_C$ when A, B, and C each correspond to the same index. In a preferred embodiment of the current invention tagRAM 104 is 120 bits wide. In the brute force approach, each of the bits of tagRAM 104 would need to be bypassed resulting in 120 physical wires required for the bypass. Note that additional wires would be required for tagRAMs which include a greater number of ways. The actual number of wires in the brute force approach is a function of the number of tag bits stored in the tagRAM and the number of states for a cache line stored in the tagRAM.

Figure 5:
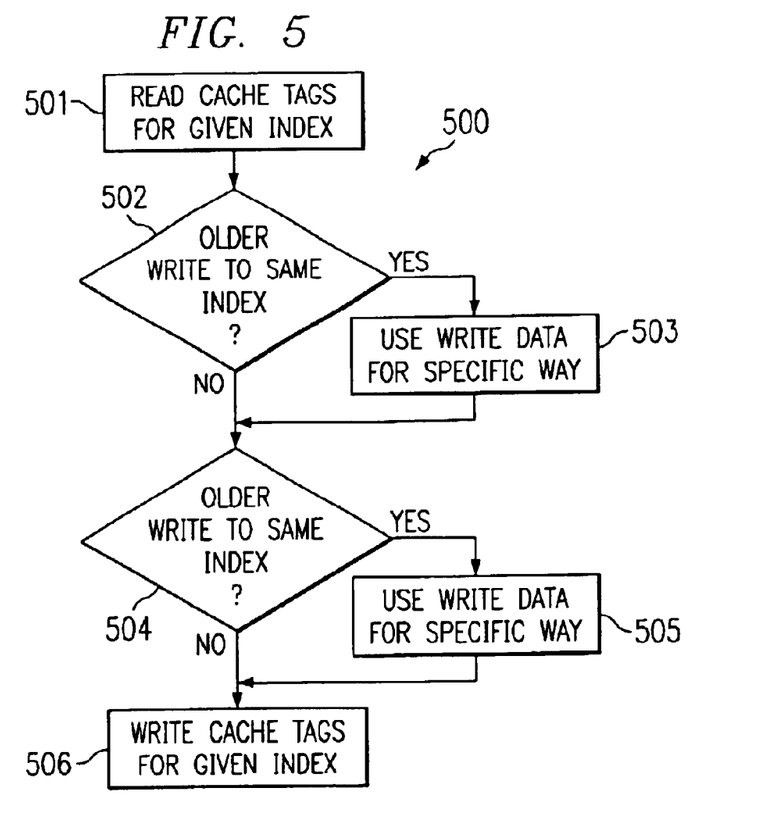
FIG. 5 is a flow chart depicting a decision process to determine when the bypass logic of the present invention should be used.

FIG. 5 is a flow chart depicting a decision process to determine when the bypass logic of the present invention should be used. In step 501 the cache tag for a given index is read. In step 502 a determination is made as to whether an old older write ($W_A$ of FIG. 3) exists to the same index. In this case an older write is defined to be a write which occurs after the associated read but before the corresponding write five (allowing four dead cycles) cycles later. If an old older write to the same index does exist, step 503 ensures the write data for the specific way is used. Similarly, in step 504 a second determination is made as to whether a young older write exists to the same index. If a young older write ($W_B$ of FIG. 3) exists the write data for the specific way is used in step 505. In step 506 the cache tags for the given index are written into tagRAM 104. If, in steps 502 and 504, intervening writes have not occurred, the cache tag is written to the appropriate portion of tagRAM 104. In the case when an intervening write for some other transaction has occurred in either step 502 or 504 for the same index, the information from the intervening write must be used because the data supersedes the data that was previously read from the cache tag. Note that in the preferred embodiment the information is written into a single way of the four way array, or in other words a single write only changes the contents of one way. Flow chart 500 includes two checks for older writes to the same index (steps 502 and 504) because in the preferred embodiment two writes may occur between the initial read and the subsequent write five cycles later. Note that other implementations may require greater or fewer checks to determine if older writes exits. A separate check for older writes may be required for every cycle between the read and the associated write. Also note that a single check for older writes may be performed, and if multiple writes have occurred, a prioritization of the previous writes may be made to determine which write contains the correct information. Referring again to FIG. 5, if steps 502 and 504 were both answered in the affirmative, the write data received in step 505 would overwrite the write data received in step 503.

Figure 6A:
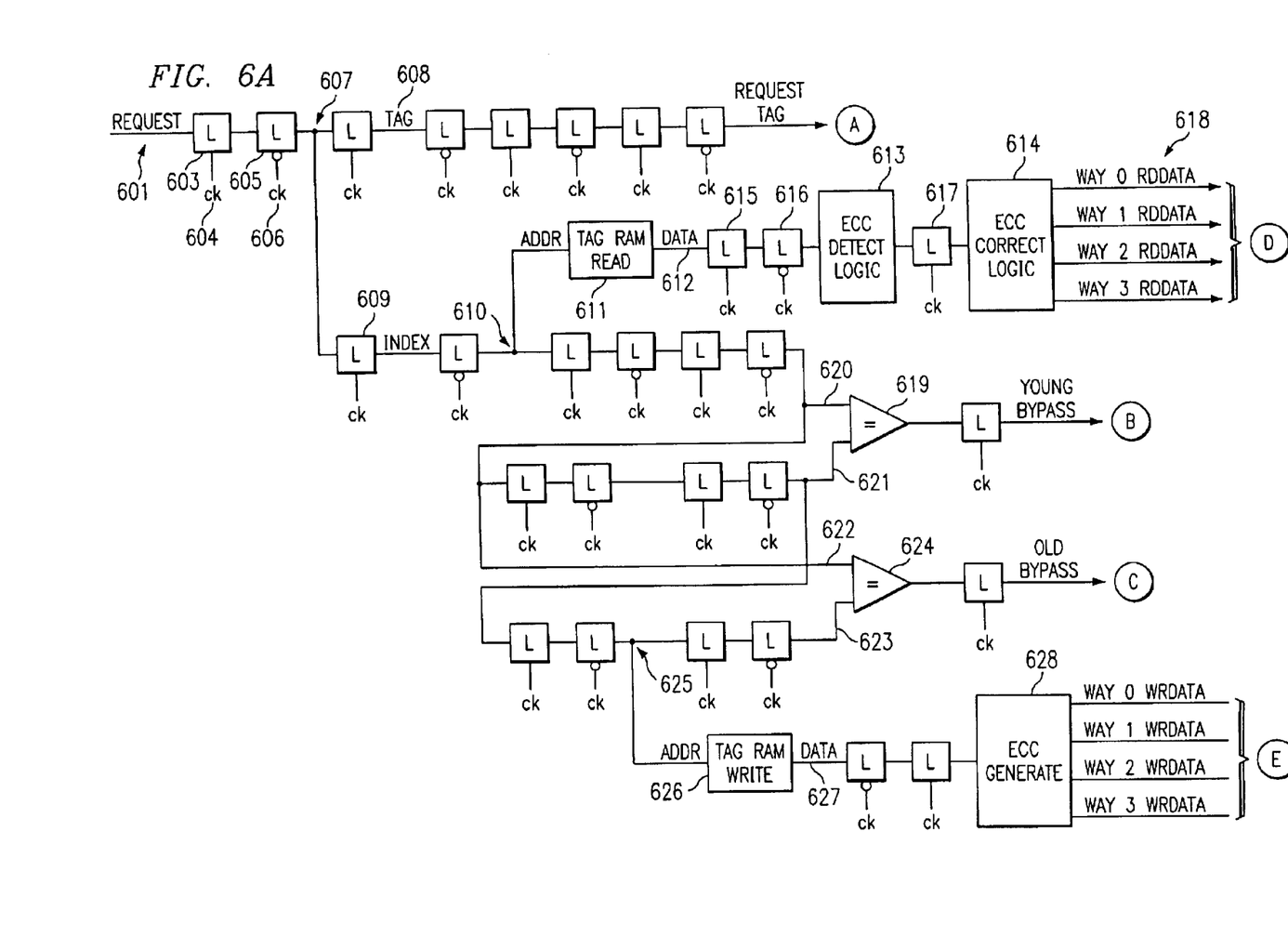
FIGS. 6A and 6B illustrate a pipeline including one implementation of the bypass circuit of the present invention.
Figure 6B:
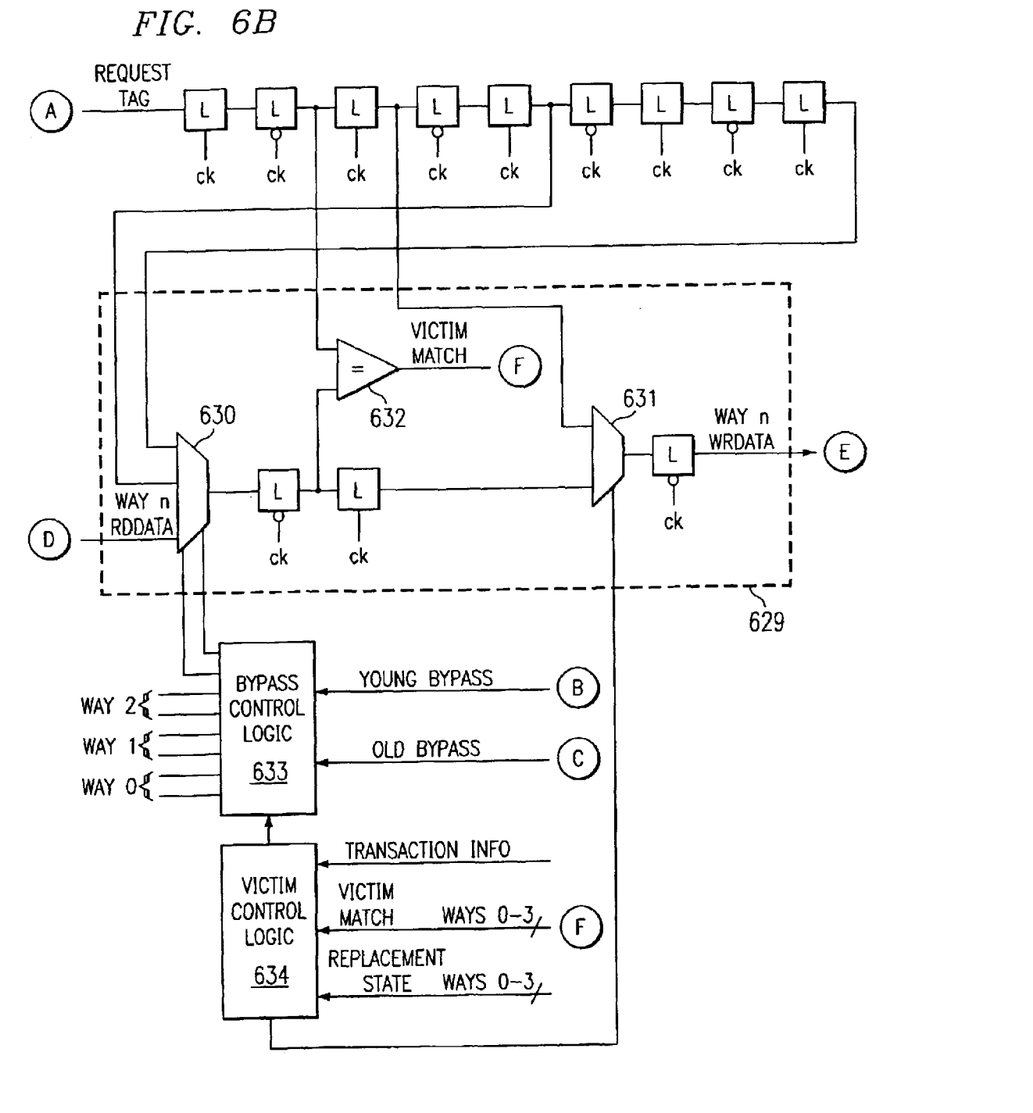

FIGS. 6A and 6B illustrate a pipeline including one implementation of the bypass circuit of the present invention. Note that reference letters A–F are used to show electrical connections between FIGS. 6A and 6B. At reference point 601 a request is received by the circuit. This request may be from the bus unit itself or it may be received from a level 1 (primary) cache. In the preferred embodiment this request represents a request for the level 2 cache to perform an action. FIGS. 6A and 6B include a number of latches 603 and an associated clock signal 604. Latches 603 are transparent latches which, when the associated clock signal 604 is on (high) the input to latch 603 is present at the output of latch 603. The subsequent latch in the series of latches 605 uses a clock signal 606 of the opposite phase. Two adjoining latches, such as latches 603 and 604, working together, operate as a flip flop. FIG. 6 is essentially a pipeline in which the request flows through the pipeline over time. At each phase of the clock the request advances to the subsequent latch. At reference point 607 the pipeline splits into a tag pipeline section 608 and an index pipeline section 609.

At reference point 610 of index pipeline section 609 the index is used to address tagRAM 104 (FIG. 1). TagRAM read 611 requires a full cycle (equivalent to two latches) to provide the address to tagRAM 104 and provides data at reference point 612. The data at reference point 612 passes through latches 615 and 616 and is applied to the input of ECC detect logic 613. The output of ECC detect logic 613 is provided to the input of latch 617 and the output of latch 617 is provided to the input of ECC correct logic 614. At the output of ECC correct logic 614 the tags for the four ways are available at reference point 618. In a preferred embodiment all ECC is performed across all four ways as a group. This approach reduces the number of bits required for ECC.

Simultaneously with the address being applied to the input of tagRAM read 611, the index passes through a number of latches until two indexes which differ with respect to time are applied to the input of comparator 619. Comparator 619 compares the index at reference point 620 with the index at reference point 621. The index present at reference point 621 is two full clock states different than the index present at reference point 620. By passing the index available at reference point 621 through four additional latches a first received request is available at reference point 621 and a second received request (received two full cycles after the first received request) is present at reference point 620. If the index at reference point 620 is equal to the index at reference point 621 a young bypass condition exists.

The index available at reference point 622 of comparator 624 is identical to the index available at reference point 620 of comparator 619. However, the index available at reference point 623 of comparator 624 has passed through eight additional latches as compared to the index available at reference point 622. The comparison within comparator 624 is of two indexes of two requests which were received four full clock states apart. If the index at reference pint 622 is equal to the index at reference point 623 an old bypass condition exits. At reference point 625 the index available at that point is applied to the input of tagRAM write 626, which also requires a full cycle (equivalent to the time required for two latches).

FIG. 6B is a continuation of FIG. 6A. FIG. 6B includes way bypass circuitry 629. Way bypass circuitry 629 includes read bypass multiplexer 630, write multiplexer 631, comparator 632. Cache write multiplexer 631 ensures updated data is written to the cache. Way bypass circuitry 629 is repeated for each of the N-ways. Read bypass multiplexer 630 includes three inputs, a first input representing the request input delayed by seventeen latches (received nine and a half cycles ago), a second input delayed by thirteen latches (received six and a half cycles ago) and the way n readdata (way n RDDATA) from ECC correct 614. When a bypass condition is not present read bypass multiplexer will pass the way n rddata value. The select signal inputs for read bypass multiplexer 630 are electrically connected to bypass control logic 633. Unique signals are used for each way. The inputs for bypass control logic 633 are a young bypass signal (the output of comparator 619 passed through a latch) and the old bypass signal (the output of comparator 624 passed through a latch). Additionally, bypass control logic 633 also receives an input from victim control logic 634. The select signal inputs for read bypass multiplexer 630 are configured to ensure that when a write occurs to the cache only one of the N-ways of the cache line is selected. If bypassing is not required the data from ECC correct logic 618 is applied to the way n RDDATA input of read bypass multiplexer 630. As shown at reference point 618 and output is available for each of the four ways.

Victim control logic 634 is used to compare the incoming request with the information that already exists in cache. In a preferred embodiment only one copy of a cache line may be resident in the cache at any time. Victim control logic 634 includes three inputs: a transaction information input, a victim match input and a replacement state input. The transaction information input identifies the type of transaction being performed. Some transactions include an identification of the way. The victim match input compares the request tag against the information that is in the cache and if they match then that way has to be the victim. The victim match input may be used to flush a specific line in the cache with a flush instruction. Note that in a preferred embodiment coherency is not maintained on instructions and that it is possible for an instruction line to be resident in the cache at the time it is desired to write the data line into the cache. In these circumstances the instruction line would be overwritten with the data line, and the way is identified as the way which corresponds to the instruction line. The replacement state input is the output from a victim selection algorithm such as a pseudo-random number generator algorithm. The replacement state input includes a state which is used by victim control logic 634 to determine which way is to be replaced. Victim control logic 634 is configured such that an output will only be present for all of the N-ways. The output of victim control logic 634 is electrically connected to the select signal for bypass cache write multiplexer 631. Cache write multiplexer 631 is used to update the cache.

Figure 6C:
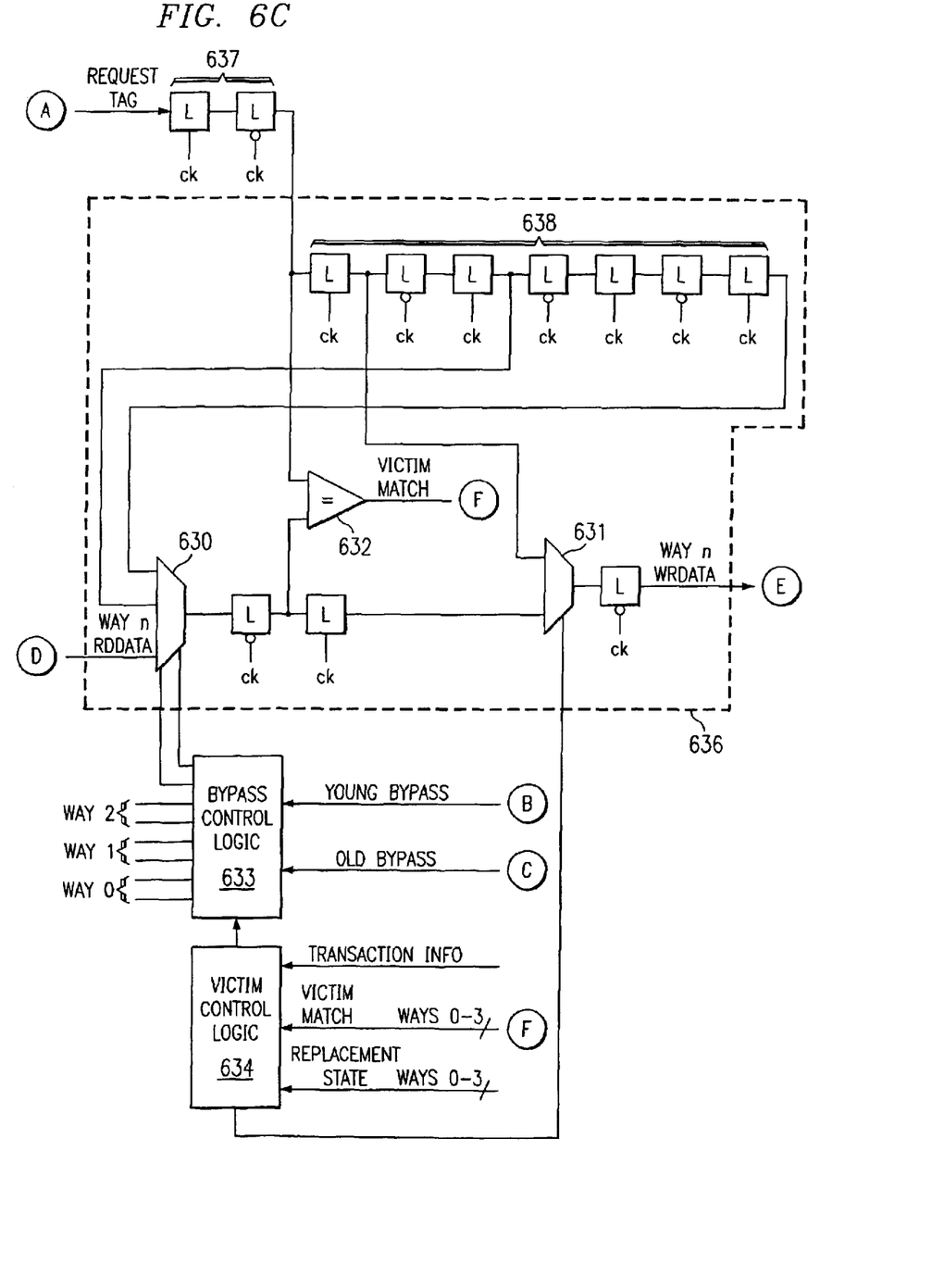
FIG. 6C illustrates a pipeline including an alternative implementation of the bypass circuit of the present invention.

FIG. 6C shows an alternate implementation of a bypass circuit to that shown in and described with reference to FIG. 6B. As depicted in FIG. 6C, the latches of the request tag pipeline are duplicated in each instance of the way bypass circuitry 636, i.e. for each of the four ways of the present illustration. This duplication of latches reduces the number of connections required between the many shared latches of the request tag pipeline configuration shown in FIG. 6B and the lesser number of shared latches (e.g., two versus nine shared latches) of the request pipeline of FIG. 6C. Reducing the number of shared latches results in a reduction in wiring at the cost of an increase in the number of duplicated latches needed to dedicate separate sets of latches for each way. The hybrid configuration of a first group 637 of latches shared by and common to all of the ways and a second group having separate sets 638 of latches for each respective way is particularly well suited to particular environments. For example, the hybrid configuration may be advantageously applied in systems having a large number of ways (e.g., at least eight ways) or where there are a large number of stages between the read and write, i.e., a large number of potential bypass paths or busses. For example, while the present example illustrates only two bypass busses (e.g., Young and Old Bypass Busses), configurations having additional bypass buses may be particularly amenable to this division of shared and duplicated latches forming the request tag pipelines.

Figure 7:
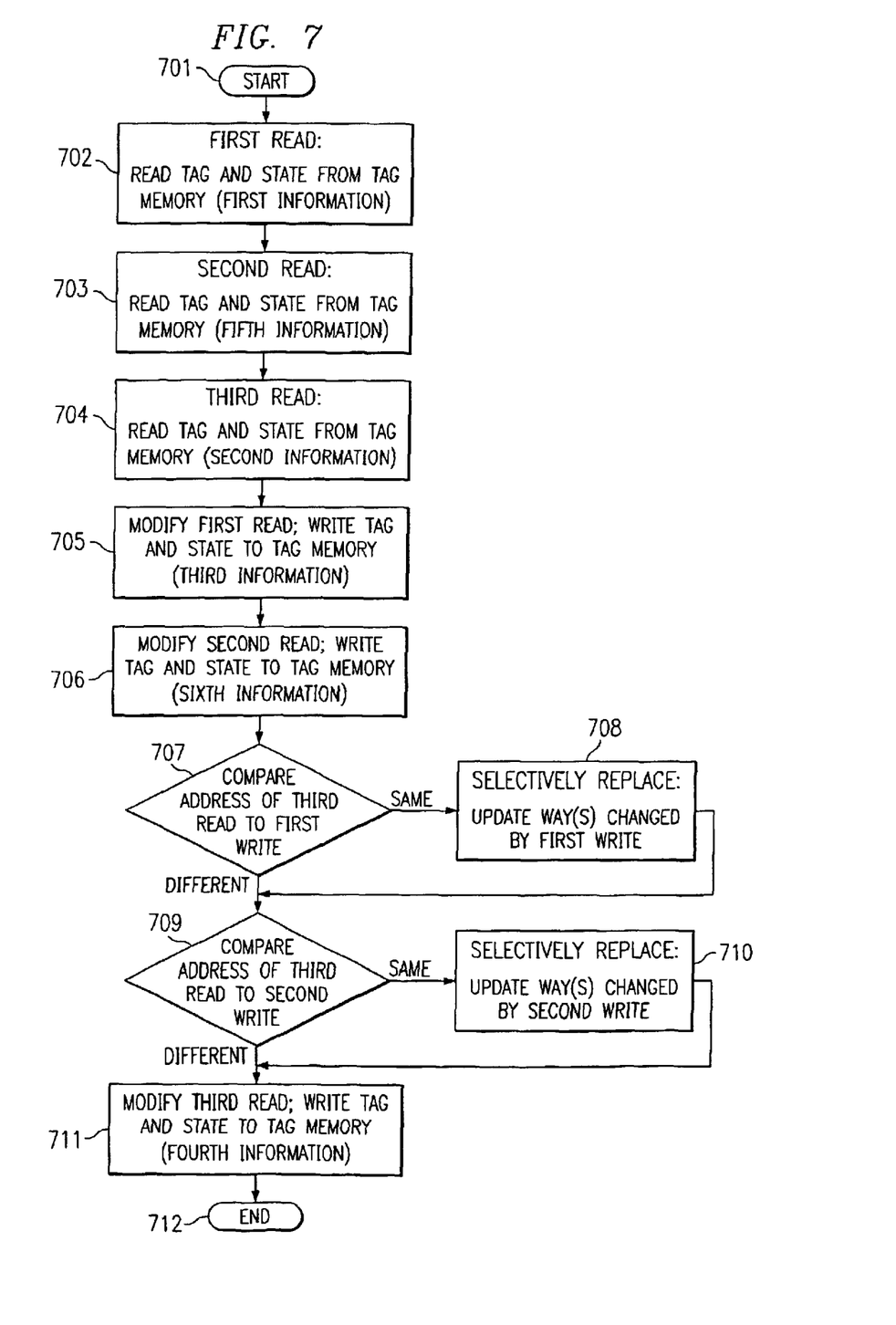
FIG. 7 is a flow chart of a method of operating a cache according to an embodiment of the invention.

FIG. 7 is a flow chart of a method of operating a cache according to an embodiment of the invention. Starting at step 701, at step 702 a first read operation is performed to read tag and state information from tag memory. This read corresponds to retrieval of first information such as the read of $R_A$ depicted in FIG. 3. At step 703 a second read operation is performed to retrieve tag and state information from tag memory. This read corresponds to retrieval of $R_B$ of FIG. 3, where $R_B$ is sometimes referred herein as fifth information. A third read operation at step 704 is performed to again read tag and state information from tag memory, this corresponding to $R_C$ and information sometimes referred to herein as second information. Step 705 includes modification of the results of the first read operation performed at step 702 with tag and state information being written to tag memory, this re-written information being referred to as third information herein. Similarly, at step 706, modifications performed of second read operation (i.e., step 703), and tag and state information is written to tag memory as sixth information. At step 707, comparison is performed of the address associated with the third read (i.e., step 704) with that used to perform the first write (i.e., step 705). If the address of the third read is equal to that of the first write, then step 708 is performed to selectively replace the data by updating the ways changed by the first write. Similarly, at step 709, comparison is performed between the address of the third read in that associated with the second write. Again, if there is a match, there is a selective replacement step performed at step 710 to update the ways changed by the second write (i.e., step 706). Finally, at step 711 the third read data (i.e., step 704) is modified as necessary to write tag and state information to tag memory. This information sometimes referred to herein as fourth information. While the process is shown to terminate at step 712, the same processing is performed for each subsequent transaction as it flows through the tag pipeline. It is understood that each subsequent transaction operates with a temporally incremented designation of the tags and information shown in FIG. 7. For example, after processing the first through third reads in steps 702, 703 and 704, in a next subsequent iteration, the second read becomes the first read and the third read becomes the second read, while the third read processes a new transaction.

What is claimed is:

1. A method of operating a cache comprising the steps of:
   reading first information from a tag memory;
   reading second information from said tag memory;
   writing third information to said tag memory updating said first information;
   comparing (I) an address of said tag memory associated with said step of reading said second information with (ii) an address of said tag memory associated with said step of writing said third information and, in response, selectively replacing said second information with said third information; and
   writing, after said step of comparing, fourth information to said tag memory updating said second information.

2. The method according to claim 1 wherein said steps of (i) reading said first information, (ii) reading said second information, and (iii) writing said third information are performed sequentially in the stated temporal order.

3. The method according to claim 1 wherein:
said step of reading said first information from said tag memory comprises a step of reading state information from said tag memory; and
said step of writing said third information to said tag memory comprises a step of writing state information to said tag memory.

4. The method according to claim 1 wherein:
said step of reading said first information from said tag memory comprises a step of reading tag information from said tag memory; and
said step of writing said third information to said tag memory comprises a step of writing tag information to said tag memory.

5. The method according to claim 1 wherein said step of comparing includes a step of:
comparing (i) a way of said tag memory associated with said step of reading said second information with (ii) a way of said tag memory associated with said step of writing said third information and, in response, performing said step of selectively replacing said second information with said third information.

6. The method according to claim 1 wherein said step of selectively replacing includes a step of delaying said third information for a predetermined time period to provided delayed information.

7. The method according to claim 6 further comprising a step of providing said delayed information to a tag pipeline instead of said second information.

8. The method according to claim 6 further comprising the step of delaying said third information in a plurality of tag pipelines.

9. The method according to claim 1 further comprising the steps of:
reading, prior to said step of writing said third information ($W_A$), fifth information ($R_B$) from said tag memory; and
comparing (i) an address of said tag memory associated with said step of reading said second information with (ii) an address of said tag memory associated with said step of writing said sixth information and, in response, selectively replacing said second information with said sixth information.

10. The method according to claim 1 further comprising the step of repeating said steps of (i) reading said first information, (ii) reading said second information, (iii) writing said third information, (iv) comparing and (v) writing said fourth information with said fourth information redesignated as said third information, a new information redesignated as said second information, and said second information redesignated as said first information.

11. The method according to claim 1 further comprising the step of continuously repeating, for some duration while the cache is operating, said steps of (i) reading said first information, (ii) reading said second information, (iii) writing said third information, (iv) comparing and (v) writing said fourth information with said fourth information redesignated as said third information, a new information redesignated as said second information, and said second information redesignated as said first information.

12. A circuit for operating a cache comprising:
a tag memory storing first and second information;
a tag pipeline connected to said tag memory to supply addressing information to said tag memory to read said first and second information;
a data bus connecting said tag memory to said tag pipeline for transmitting said first and second information to said tag pipeline;
said tag pipeline further configured to cause said tag memory to write third information to said tag memory updating said first information;
a comparator configured to compare (i) an address of said tag memory associated with said second information with (ii) an address of said tag memory associated with said third information;
a first multiplexer responsive to a compare a signal output by said comparator for causing said second information to be selectively updated by said third information to form updated second information; and
a second multiplexer operational to cause said tag pipeline to selectively modify said updated second information with said fourth information.

13. The circuit according to claim 12 wherein said tag pipeline comprises a first group of memory elements shared between and common to each of several ways of said tag memory.

14. The circuit according to claim 13 wherein said tag pipeline further comprises a second group of said memory elements including respective separate sets of said memory elements for each of said ways of said tag memory.

15. The circuit according to claim 12 configured to transmit said first and second information in that order and, subsequently write said third information to said tag memory.

16. The circuit according to claim 12 wherein:
said tag memory stores state information associated with said first information and said data bus is operational to transmit said state information to said tag pipeline; and
said tag pipeline is operational to supply state information to said tag memory and said tag memory is operational to store said state information.

17. The circuit according to claim 12 wherein:
said tag memory stores tag information associated with said first information and said data bus is operational to transmit said tag information to said tag pipeline; and
said tag pipeline is operational to supply tag information to said tag memory and said tag memory is operational to store said tag information.

18. The circuit according to claim 12 further comprising:
bypass control logic operational to receive and compare (i) a way of said tag memory associated with said step of reading said second information with (ii) a way of said tag memory associated with said step of writing said third information and, in response, selectively initiate replacement of said second information with said third information.

19. The circuit according to claim 12 further comprising a delay circuit operational to selectively delay said third information for a predetermined time period to provide delayed information.

20. The circuit according to claim 19 further comprising a multiplexer connected to said tag pipeline to selectively provide thereto said delayed information instead of said second information.

21. The circuit according to claim 19 further comprising a plurality of said tag pipelines operational in parallel with one another for simultaneously delaying said third information.

22. The circuit according to claim 12 wherein:
said tag pipeline is further operational to supply addressing information to said tag memory to read, prior to said writing of said third information, fifth information from said tag memory; and said circuit further comprising a comparator operational for comparing (i) an address of said tag memory associated with reading said fifth information with (ii) an address of said tag memory associated with writing said fourth information, said comparator connected to selectively initiate replacement of said fifth information with said fourth information.

23. The circuit according to claim 12 wherein said circuit is configured to redesignated said fourth information as said third information, redesignate new information as said second information, and redesignate said second information as said first information.

24. The circuit according to claim 23 wherein, after a designation operation of said circuit, (i) said tag pipeline is operational to read said first and second information from, and to write said third information to said tag memory, (ii) said comparator is further configured to compare said address of said tag memory associated with said second information with said address of said tag memory associated with said third information, (iii) said first multiplexer is responsive to a compare said signal output by said comparator for causing said second information to be selectively updated by said third information to form updated second information; and (iv) said second multiplexer is operational to cause said tag pipeline to selectively modify said updated second information with said fourth information.

25. A circuit for operating a cache comprising the steps of:

means for reading first information from a tag memory;

means for reading second information from said tag memory;

means for writing third information to said tag memory updating said first information;

means for comparing (i) an address of said tag memory associated with said reading of said second information with (ii)an address of said tag memory associated with said writing of said third information and, in response, selectively replacing said second information with said third information; and means for writing, after said selective replacement, fourth information to said tag memory updating said second information.

* * * * *

UNITED STATES PATENT AND TRADEMARK OFFICE
CERTIFICATE OF CORRECTION

PATENT NO. : 6,950,906 B2  Page 1 of 1
APPLICATION NO. : 10/319205
DATED : September 27, 2005
INVENTOR(S) : Robert F. Krick et al.

It is certified that error appears in the above-identified patent and that said Letters Patent is hereby corrected as shown below:

In column 12, line 58, in Claim 1, delete "(I)" and insert -- (i) --, therefor.

Signed and Sealed this

Twenty-first Day of July, 2009

JOHN DOLL
*Acting Director of the United States Patent and Trademark Office*